Patented May 5, 1925.

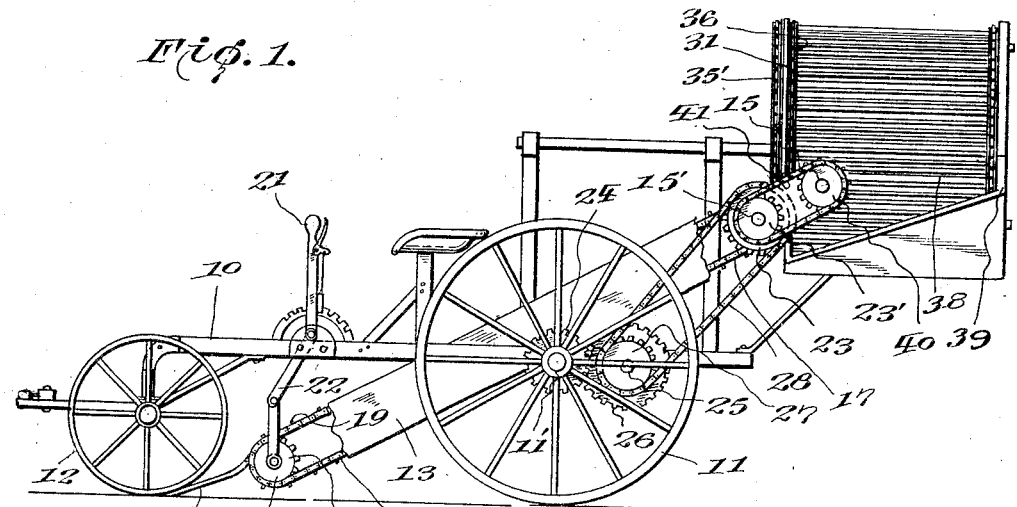
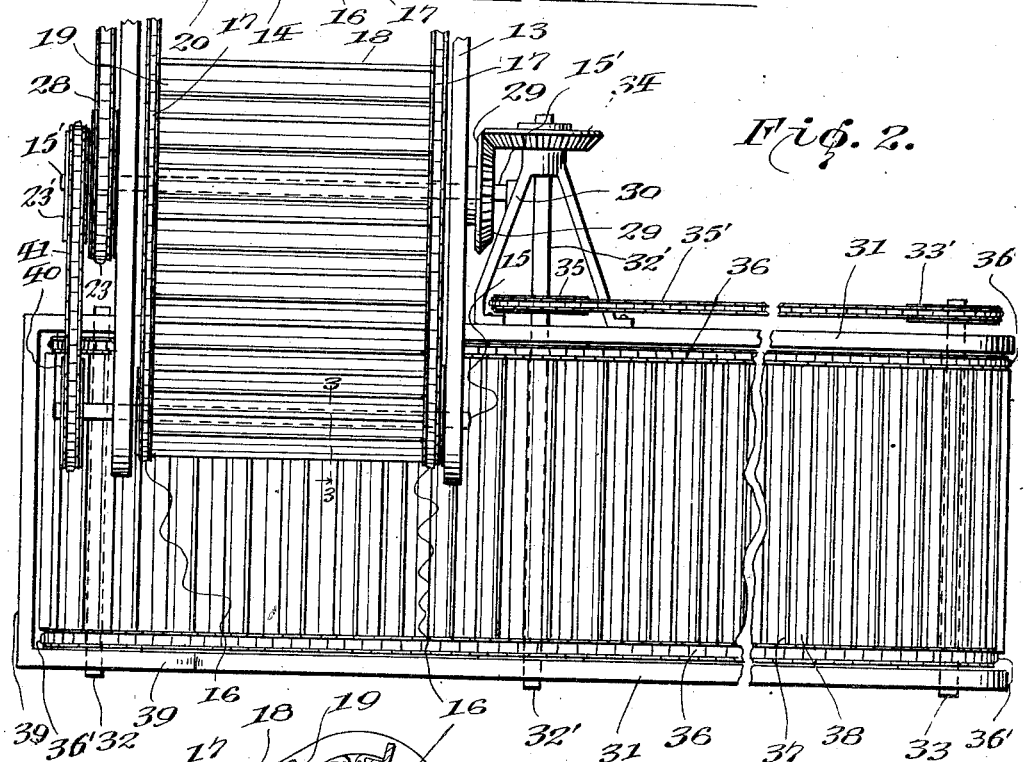

1,536,187

UNITED STATES PATENT OFFICE.

PORTER C. BAKER AND JOHN H. GIBSON, OF MORRILL, NEBRASKA.

BEET ELEVATOR.

Application filed May 17, 1921. Serial No. 470,230.

*To all whom it may concern:*

Be it known that we, PORTER C. BAKER and JOHN H. GIBSON, citizens of the United States, residing at Morrill, in the county of Scotts Bluff, State of Nebraska, have invented certain new and useful Improvements in Beet Elevators; and we do hereby declare the following to be a full, clear, and exact description of the invention, such as will enable others skilled in the art to which it appertains to make and use the same.

This invention relates to new and useful improvements in beet harvesters.

One object of the invention is to provide a machine of this character having novel and improved driving connections between the main elevator and the lateral discharging elevator.

Another object resides in the novel and improved construction of the elevator belt, whereby the beets are efficiently lifted and carried upwardly.

Other objects and advantages will be apparent from the following description when taken in connection with the accompanying drawing.

In the drawing:

Figure 1 is a side elevation of a beet harvesting machine made in accordance with the invention.

Figure 2 is a top plan view of the same.

Figure 3 is an enlarged vertical sectional view through a portion of the elevator belt, on the line 3—3 of Figure 2.

Referring particularly to the accompanying drawing, 10 represents a frame which is supported on the ground wheels 11. The forward end of the frame is supported on the draft truck 12.

Pivotally supported on the frame, and extending longitudinally thereof, is a frame 13, and in the opposite ends of this frame are supported the transverse shafts 14 and 15, each carrying sprocket wheels 16, on the ends for engagement of the chains 17. Extending transversely between the chains 17, and having their ends connected thereto, are the rods 18, and at regularly spaced intervals, throughout the length of the chains, are the transversely extending angle strips 19, the ends of said strips being secured to the inner vertical faces of opposite links of the chains and serving to carry the beets upwardly after having been lifted from the ground by the digger 20. The horizontal wing of each angle strip extending longitudinally of the link and the other wing extending outwardly from between the opposite links. On the forward portion of the frame 10 is mounted a lever 21, said lever being connected with the forward or lower end of the elevator frame 13, by means of the links 22. Mounted transversely in the chute, inwardly of the upper shaft 15, is a shaft 15' and on the outer end of this shaft are mounted the sprocket wheels 23 and 23', the latter being slightly smaller in diameter than the former. The shaft 15 also has a sprocket 40 which is driven from the sprocket 23' by the chain 41.

On the outer end of the upper shaft 15' there is secured a sprocket wheel 23. On the axle 11' of the ground wheels 11, there is secured a gear wheel 24. Supported in the frame 13, and extending below the laps of the conveyor belt 17, is a shaft 25, and mounted on the outer end of this shaft is a gear 26 which meshes with the gear 24. Also carried by the shaft 25, outwardly of the gear 26, is a sprocket wheel 27, and engaged around the sprocket wheel 27 and sprocket wheel 23, is a drive chain 28.

On the inner end of the shaft 15' is mounted a bevel gear 29, said shaft being extended beyond the side of the frame 13, and supported in the bracket 30. Mounted on the upper end of the frame 13, and extending laterally therefrom, is a frame 31, the same rotatably supporting in its ends the shafts 32 and 33. In the intermediate portion of the frame 31 is a transverse shaft 32' which has on its inner end a sprocket 35 which drives the shaft 33 through the chain 35' and the sprocket 33', the latter of which is mounted on the inner end of the shaft 33. The shaft 32' extends inwardly and is supported in the bracket 30, said bracket being carried by the said frame 31. The shaft 32' has a bevel gear 34 on one end which meshes with the gear 29. Also carried by the shaft 32, as well as the shaft 33, are the sprocket wheels 36', around which are engaged the chains 36. Extending between these chains 36, and connected thereto, are the rods 37 and the angle strips 38, similar to those of the first or main conveyor.

Thus, as the machine is drawn, the ground wheels, through the gears 24, drive the main elevator belt, to carry the beets upwardly, from which they are discharged onto the lateral elevator and delivered to wagons or other receptacles located therebeneath.

On the outer side of the intersection of the frames 13 and 31, are mounted the guard boards 39 which prevent the beets from dropping off when being transferred from the main elevator to the lateral elevator.

What is claimed is:

A conveyor belt comprising a pair of parallel chains each including links, transverse rods extending between and connected to the centers of the inner vertical faces of certain alternate links of the chains, and angle bars extending between and secured to the centers of the inner vertical faces of the other alternate opposite links of the chains, one wing of each of the angle bars extending longitudinally and centrally of the links, the other wing of each angle bar extending at an angle outwardly from between the said opposite links.

In testimony whereof, we affix our signatures, in the presence of two witnesses.

PORTER C. BAKER.
JOHN H. GIBSON.

Witnesses:
H. C. KARPF,
E. C. ZIMMERMAN.